(12) United States Patent
Chen et al.

(10) Patent No.: US 6,321,223 B1
(45) Date of Patent: Nov. 20, 2001

(54) METHOD OF IDENTIFYING MULTILINGUAL TEXT FOR DOS

(75) Inventors: Tong S. Chen; Kuang Shin Lin, both of Taipei (TW); Jun Liu; Dong Min, both of Tianjin (CN)

(73) Assignee: Inventec Corp., Taipei (TW)

( * ) Notice: Subject to any disclaimer, the term of this patent is extended or adjusted under 35 U.S.C. 154(b) by 0 days.

(21) Appl. No.: 09/348,387

(22) Filed: Jul. 7, 1999

(51) Int. Cl.[7] .................................................. G06F 17/30
(52) U.S. Cl. .................................. 707/5; 707/2; 707/10; 707/104; 705/6; 709/229; 713/201; 345/352; 379/15; 379/34
(58) Field of Search .................................. 707/1, 2, 4, 9, 707/10, 100–104, 5; 379/10, 14, 15, 29, 34; 705/2, 6, 54; 709/229; 713/200, 201; 345/352, 357

(56) References Cited

U.S. PATENT DOCUMENTS

| | | | |
|---|---|---|---|
| 4,477,880 | * 10/1984 | Advani et al. | 707/200 |
| 4,559,614 | * 12/1985 | Peek et al. | 709/100 |
| 5,053,945 | * 10/1991 | Whisler | 707/200 |
| 5,379,422 | * 1/1995 | Antoshenkov | 707/1 |
| 5,537,592 | * 7/1996 | King et al. | 707/200 |
| 5,956,718 | * 9/1999 | Prasad et al. | 707/10 |

OTHER PUBLICATIONS

Kiyota, Youji et al., "Automatic Summarization of Japanese Sentences and its Application to a WWW KWIC Index", Proceedings of the 2001 Symposium on Applications and the Internet, Jan. 8–12, 2001, pp. 120–127.*

Kuo, Y. S. et al., "A data structure for fast region searches", IEEE Design & Test of Computers, Oct. 1989, vol.: 6, Issue: 5, pp. 20–28.*

* cited by examiner

Primary Examiner—Hosain T. Alam
Assistant Examiner—Shahid Alam
(74) Attorney, Agent, or Firm—W. Wayne Liauh

(57) ABSTRACT

The present invention is related to a text identification method for opening a specific file which is edited by double-byte characters for the double-byte language systems, such as Traditional Chinese, Simplified Chinese, Japanese and Korean etc., in a DOS operating environment. The present invention search and identify the specific file by skipping the API provided by DOS to correctly open the specific file edited by double-byte characters for the double-byte language systems.

10 Claims, 5 Drawing Sheets

METHOD OF IDENTIFYING MULTILINGUAL TEXT FOR DOS

FIELD OF THE INVENTION

The present invention is related to a text identification method, implemented in a computer system, for opening a specific file that is edited by multilingual text and stored in recording media for a DOS operating environment.

BACKGROUND OF THE INVENTION

DOS (disk operating system, DOS) is a well-known operating system that is very flexible and easy to use for general users and program designers. DOS provides many good functions. FIG. 1 is the flow chart for the process to open a file in DOS environment for a prior art example. First, in the case of using C programming language, an instruction of opening the file which is named as "patent" is stared to execute in C programming language library. The proper API (application programming interface, API) function, which provides by DOS, will be subsequently invoked. The general format of the API function invoked is presented as following:

fopen(filename, mode)

In order to open the file which file name is "patent", the API function will be as following:

fopen("patent", "r")

According to the parameters ("patent" in this case) passed to the API function, the API function will search the directory cluster in the disk driver for the file. When the file is found, open and read the content of the file. However, DOS is mainly designed based on English. There are many problem caused by using DOS in other language systems.

A character is presented by two bytes for most of the language systems in Asia, such as Traditional Chinese, Simplified Chinese, Japanese and Korean etc. These language systems are called as double-byte language systems. In the double-byte language systems, a character is composed by two ASCII codes. When these double-byte characters are processed, these double-byte characters need to be converted to two corresponding ASCII codes so that these double-byte language system which contains numerous characters can be processed by computer. The ASCII codes of the upper case and the lower case for the same English alphabet are different. Both the ASCII codes of the upper case and the lower case will be used to present a double-byte character in the double-byte language systems. However, DOS will treat the upper case and the lower case for the same English alphabet without difference. A error of identification will consequently occur when a file, which is named in double-byte language, is to be read in DOS, because DOS cannot identify two double-byte characters that one contains the upper case and the other contains the lower case for the same English alphabet.

SUMMARY OF THE INVENTION

The present invention is directed toward resolving the above problems. Namely, an object of the present invention is to provide a text identification method for identifying a specific file which is edited by double-byte characters for the double-byte language systems, such as Traditional Chinese, Simplified Chinese, Japanese and Korean etc., in a DOS operating environment.

In order to accomplish this object, the text identification method of the present invention search and identify the specific file by skipping the API provided by DOS. Directly search the disk for the specific directory and identify the file name by skipping the API provided by DOS can overcome the error of identification occurred in the prior art.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE INVENTION

Figure 1:
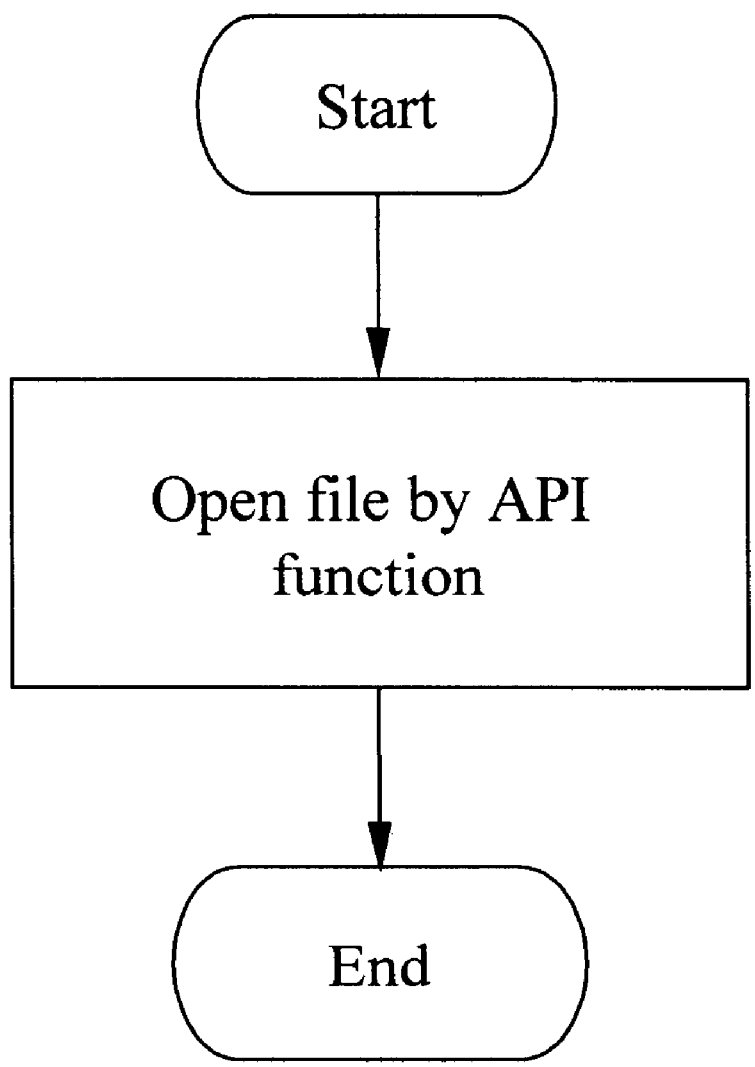
FIG. 1 is the flow chart for the process to open a file in DOS environment for a prior art example.
Figure 2:
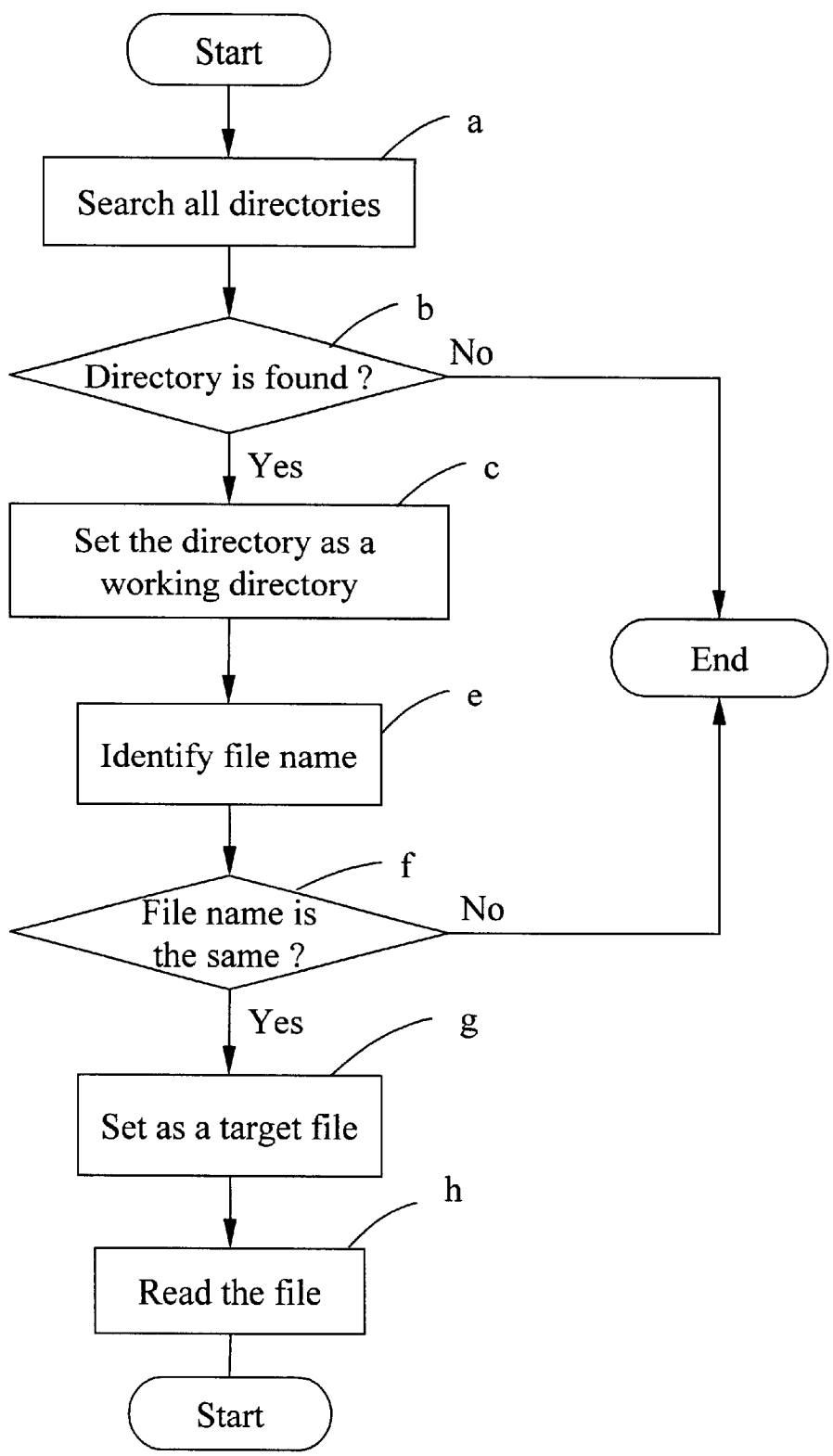
FIG. 2 is the flow chart of the present invention.

Please refer to FIG. 2. This invention provides a text identification method for identifying a specific file which is edited by multilingual text for a DOS operating environment. The main procedure for opening a specific file is as following.

Step a): Searching all directories in the disk for the specific directory;

Step b): Determining whether the specific directory is found;

Step c): Setting the directory as a working directory when a directory is found from the directory searching step;

Step d): Ending the specific file opening when a directory is not found from the directory searching step;

Step e): Identifying the file name of all files in the working directory;

Step f): Comparing the file name of the file in the working directory with the file name of the specific file;

Step g): Setting the file, which file name is the same as that of the specific file, as a target file; or ending the specific file opening when no file in the working directory has the same file name as the specific file; and Step h): Reading the content of the target file.

Figure 3:
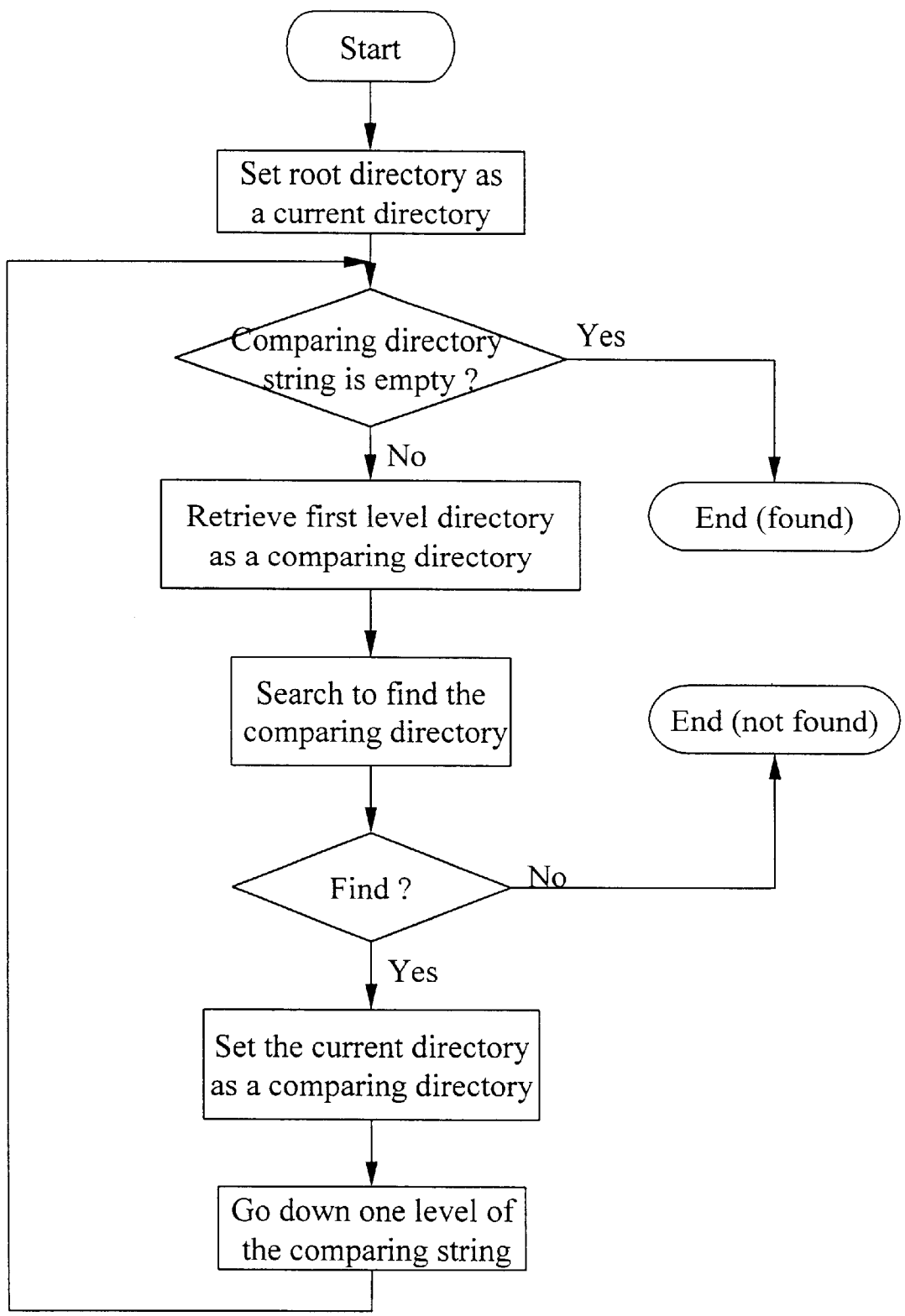
FIG. 3 is the flow chart for the process searching the directory of the present invention.

FIG. 3 is the flow chart for the process searching the directory of the present invention. The specific directory searching and setting step for searching a specific directory which contains the specific file in the recording media and setting the specific directory as a working directory, comprises the steps of:

1). Setting root directory in the storage media, such as disk, as a current directory;

2). Determining whether a comparing directory string for the specific directory, which contains the specific file, is empty or not;

3). Setting a specific directory which contains the specific file and is searched out as a working directory and ending the specific directory search, when the directory string determining step judges that the comparing directory string is empty;

4). Retrieving first level directory from the comparing directory string for the specific directory as a comparing directory, when the directory string determining step judges that the comparing directory string is not empty, to compare with all sub-directories in the current directory;

5). Searching all sub-directories of the current directory to find the comparing directory contained in the current directory;

6). Determining whether a sub-directory is found and ending directory search, when a sub-directory is not found from the sub-directory searching step;

7). Setting the current directory as a comparing directory, when a sub-directory is found from the sub-directory searching step; and 8). Removing the comparing directory from the comparing directory string for the specific directory, to go down one level of the comparing directory string for the specific directory and going to the directory string determining step.

The following is an explanation of the operation for the specific directory searching and setting step as described above. As mentioned above, since the specific directory which contains the specific file is [\b\γ\IV], the comparing directory string is [\b\γ\IV]. First, the root directory [\] is set as a current directory. The root directory [\] contains sub-directories: [\a], [\b], [\c] . . . Next, judge whether the comparing directory string for the specific directory is empty or not. The comparing directory string [\b\γ\IV] here is not empty, so retrieve first level directory [\b] from the comparing directory string for the specific directory as a comparing directory. Search all sub-directories of the current directory [\] to find the comparing directory contained in the current directory. Since, the comparing directory [\b] is found from the sub-directory searching step, set the current directory as the comparing directory [\b]. Further, remove the comparing directory [\b] from the comparing directory string for the specific directory, to go down one level of the comparing directory string for the specific directory. The comparing directory string now becomes as [\γ\IV].

The current directory is at present [\b] and the comparing directory string is [\γ\IV]. Return to the directory string determining step to judge whether the comparing directory string for the specific directory is empty or not. The comparing directory string [\γ\IV] here is not empty, thus retrieve first level directory [\γ] from the comparing directory string for the specific directory as a comparing directory. Search all sub-directories of the current directory [\b] to find the comparing directory contained in the current directory. The current directory [\b] contains sub-directories: [\α], [\β], [\γ], [\δ] . . . The comparing directory [\γ] is found from the sub-directory searching step, the current directory is followed set to be the comparing directory [\γ]. Moreover, remove the comparing directory [\γ] from the comparing directory string for the specific directory, to go down one level of the comparing directory string for the specific directory. The comparing directory string now becomes as [\IV].

The current directory is at present [\γ] and the comparing directory string is [\]. Return to the directory string determining step to judge whether the comparing directory string for the specific directory is empty or not. The comparing directory string [\IV] is not empty, thus retrieve first level directory [\IV] from the comparing directory string for the specific directory as a comparing directory. Search all sub-directories of the current directory [\γ] to find the comparing directory contained in the current directory. The current directory [\γ] contains sub-directories: [\I], [\II], [\III], [\IV] . . . The comparing directory [\IV] is found from the sub-directory searching step. Set the current directory as the comparing directory [\IV] and remove the comparing directory [\IV] from the comparing directory string for the specific directory to go down one level of the comparing directory string for the specific directory. The comparing directory string now becomes [ ].

The current directory is at present [\IV] and the comparing directory string is [\]. Return to the directory string determining step to judge whether the comparing directory string for the specific directory is empty or not. Since, the comparing directory string [\] here is empty, set the specific directory [\b\γ\IV] which is searched out as a working directory and ending the specific directory search.

Figure 4:
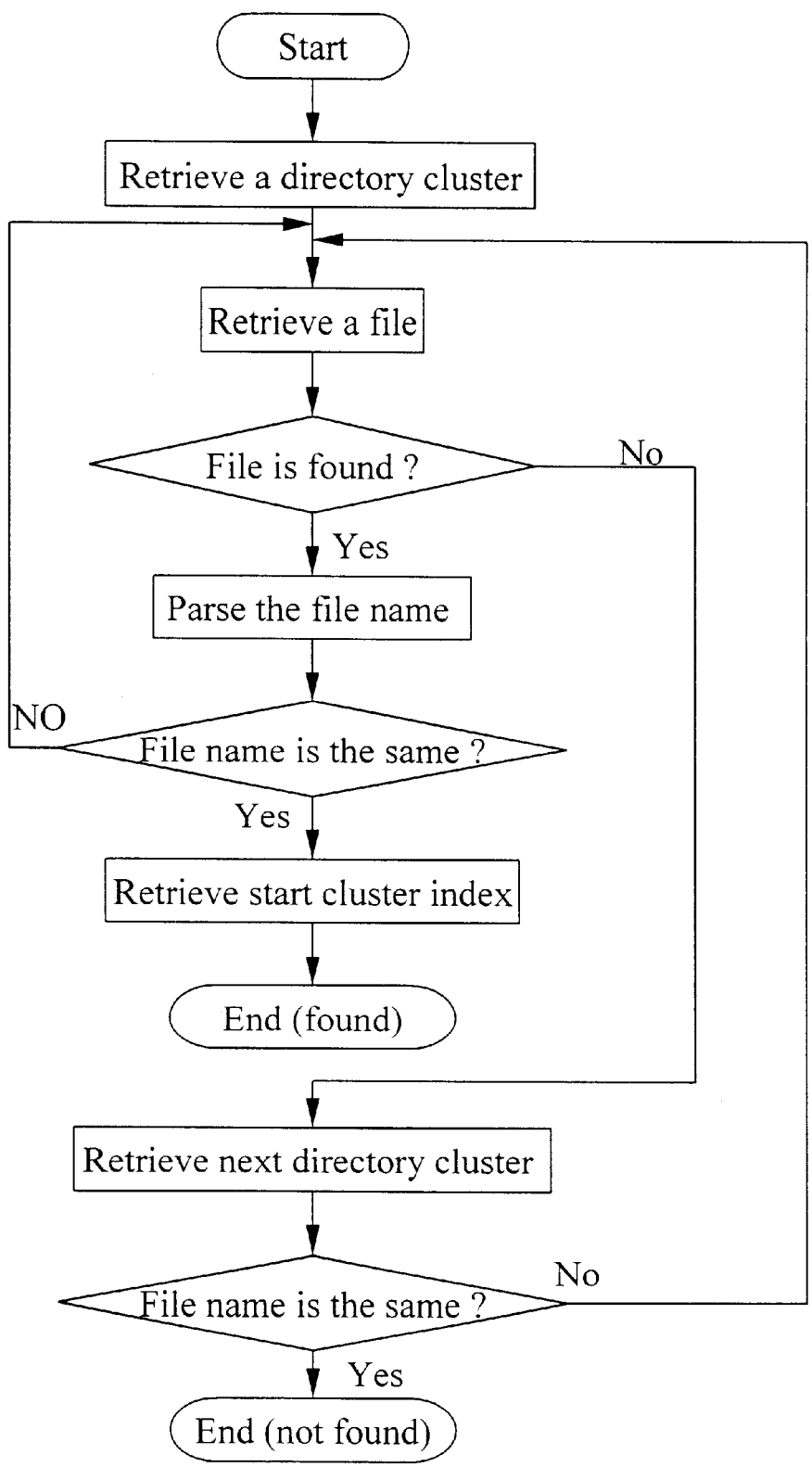
FIG. 4 is the flow chart for the process identifying the file name of the present invention.

FIG. 4 is the flow chart for the process identifying the file name of the present invention. The target file searching step for searching a target file, wherein the filename of the target file is the same as that of the specific file, in the working directory comprises the steps of:

1). Retrieving a directory cluster from the working directory (setting the first directory cluster as the initial value) to identify all files in the directory cluster;

2). Retrieving a file from the directory cluster;

3). Determining whether the file is found;

4). Parsing the file name sector, which is usually composes by eight bytes for the file name and three bytes for the extension file name, for the file and then retrieving the file name of the file with the information of upper case and lower case by skipping the API provided by DOS, when a file is found;

5). Comparing the file name of the file with the file name of the specific file, since the present invention can identify the difference between upper case and lower case, every eleven bytes, eight bytes for the file name and three bytes for the extension file name, for the file name of the file must be the same even in upper case or lower case as that of the specific file;

6). Retrieving start cluster index for the file and setting the file as a target file, when the file name of the file is the same even in upper case or lower case as the file name of the specific file;

7). Retrieving next directory cluster from the working directory, when a file is not found, and going to the file retrieving step for retrieving a file from the directory cluster; and 8). Going to the file retrieving step, when the file name of the file is not the same as the file name of the specific file.

Figure 5:
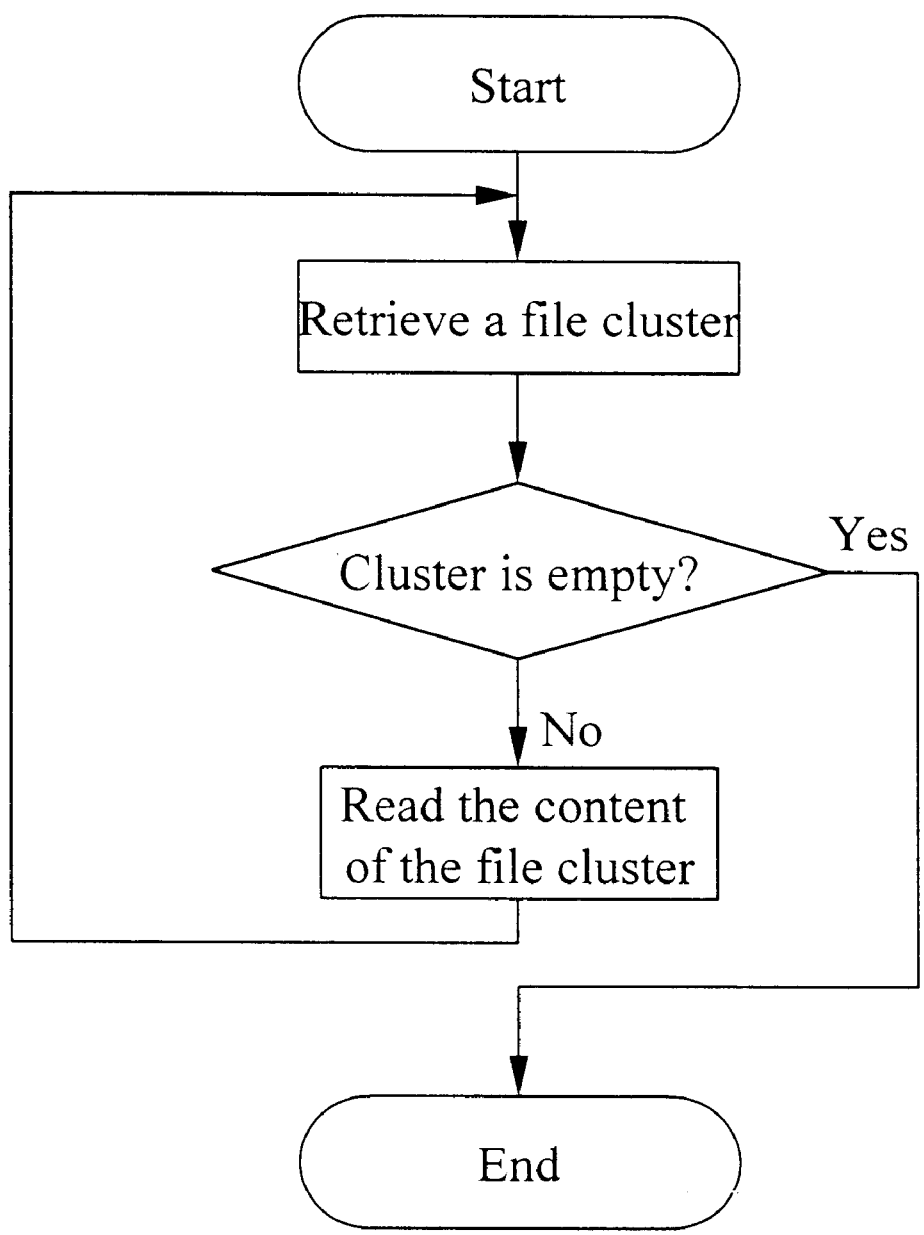
FIG. 5 is the flow chart for the process reading the content of the specific file of the present invention.

FIG. 5 is the flow chart for the process reading the content of the specific file of the present invention. The target file reading step comprises the steps of:

1). Retrieving a file cluster from the target file;

2). Reading the content of the file cluster, when the file cluster is not empty; and 3). Ending target file read, when the file cluster is empty.

It is noted that the method for identifying multilingual text for DOS described above are the preferred embodiments of the present invention for the purposes of illustration only, and are not intended as a definition of the limits and scope of the invention disclosed. Any modifications and variations that may be apparent to a person skilled in the art are intended to be included within the scope of the present invention.

What is claimed is:

1. A text identification method, implemented in a computer system, for identifying a specific file which is edited by multilingual text and stored in a recording media for a DOS operating environment, comprising:

searching a specific directory which contains said specific file in said recording media and setting said specific directory as a working directory, further comprising:
setting current directory to the root directory;
determining whether a comparing directory string for said specific directory is empty;
setting said specific directory which contains said specific file and is searched out as a working directory and ending the specific directory search, when said comparing directory string is empty;
retrieving first level directory from said comparing directory string for said specific directory as a comparing directory when said comparing directory string is not empty;
searching for said comparing directory in all sub-directories of said current directory;
ending directory search, when said comparing directory is not found from the sub-directory searching step;
setting said current directory as said comparing directory when said specific directory is found;
removing said comparing directory from said comparing directory string for said specific directory, to go down one level of the comparing directory string for said specific directory;
going to the directory string determining step; and a target file searching step for searching a target file, wherein the filename of said target file is the same as that of said specific file, in said working directory.

2. The text identification method of claim 1, further comprising the identification ending step for ending, when said specific directory containing said specific file in said recording media is not found, the process of file identification.

3. The text identification method of claim 1, further comprising the identification ending step for ending, when said target file is not found, the process of file identification.

4. The text identification method of claim 1, wherein the target file searching step comprises the steps of:
retrieving a directory cluster from said working directory to identify all files in said directory cluster;
retrieving a file from said directory cluster;
parsing the file name sector for said file and retrieving the file name of said file, when a file is found;
comparing the file name of said file with the file name of said specific file;
retrieving start cluster index for said file and setting said file as a target file, when the file name of said file is the same as the file name of said specific file;
retrieving next directory cluster from said working directory, when a file is not found, and going to the file retrieving step for retrieving a file from said directory cluster; and
going to the file retrieving step, when the file name of said file is not the same as the file name of said specific file.

5. A text identification method, implemented in a computer system, for opening a specific file which is edited by multilingual text and stored in recording media for a DOS operating environment, comprising the steps of:

a file opening execution starting step for staring file opening;

a specific directory searching and setting step for searching a specific directory which contains said specific file in said recording media and setting said specific directory as a working directory, wherein the specific directory searching and setting step comprises the steps of:
setting current directory to the root directory;
determining whether a comparing directory string for said specific directory is empty;
setting said specific directory which contains said specific file and is searched out as a working directory and ending the specific directory search, when said comparing directory string is empty;
retrieving first level directory from said comparing directory string for said specific directory as a comparing directory when said comparing directory string is not empty;
searching for said comparing directory in all sub-directories of said current directory;
ending directory search, when said comparing directory is not found from the sub-directory searching step;
setting said current directory as said comparing directory when said specific directory is found;
removing said comparing directory from said comparing directory string for said specific directory, to go down one level of the comparing directory string for said specific directory;
going to the directory string determining step;

a target file reading step for reading the content of said target file; and a file opening execution ending step for ending file opening.

6. The text identification method of claim 5, further comprising the identification ending step for ending, when said specific directory containing said specific file in said recording media is not found, the process of file identification.

7. The text identification method of claim 5, further comprising the identification ending step for ending, when said target file is not found, the process of file identification.

8. The text identification method of claim 5, wherein the target file searching step comprises the steps of:
retrieving a directory cluster from said working directory to identify all files in said directory cluster;
retrieving a file from said directory cluster;
parsing the file name sector for said file and retrieving the file name of said file, when a file is found;
comparing the file name of said file with the file name of said specific file;
retrieving start cluster index for said file and setting said file as a target file, when the file name of said file is the same as the file name of said specific file;

retrieving next directory cluster from said working directory, when a file is not found, and going to the file retrieving step for retrieving a file from said directory cluster.

9. The text identification method of claim 5, wherein the target file reading step comprises the steps of:

retrieving a file cluster from said target file;

reading the content of said file cluster, when said file cluster is not empty; and ending target file read, when said file cluster is empty.

10. A computer readable recording media for which files edited by multilingual text can be stored and opened for a DOS operating environment, comprising: a directory cluster bank includes:

information of directory cluster for all directories; and information of file groups, which is corresponding to the directory cluster, including file cluster index and file name;

a directory searching command set for searching the directory cluster for a specific file from said directory cluster bank;

a file retrieving command set for seriatim retrieving the file groups from said directory cluster;

a file name list, which is a recording area for a list used to compare the file name of said specific file and the file name of the retrieved file groups; and a file reading command set for reading the content of said specific file.

\* \* \* \* \*